United States Patent [19]

Wolga

[11] 4,080,073

[45] Mar. 21, 1978

[54] MEASUREMENT OF RAMAN SCATTERING INDEPENDENT OF FLUORESCENCE

[75] Inventor: George J. Wolga, Ithaca, N.Y.

[73] Assignee: Lansing Research Corporation, Ithaca, N.Y.

[21] Appl. No.: 735,455

[22] Filed: Oct. 26, 1976

[51] Int. Cl.² .............................................. G01J 3/44
[52] U.S. Cl. .................................................... 356/75
[58] Field of Search .......................................... 356/75

[56] References Cited
U.S. PATENT DOCUMENTS

| | | | |
|---|---|---|---|
| 3,807,862 | 4/1974 | Hatzenbuhler | 356/75 |
| 3,914,055 | 10/1975 | Wolga et al. | 356/75 |

OTHER PUBLICATIONS

Arquello et al., Applied Optics, vol. 13, No. 8, Aug. 1974, pp. 1731 and 1732.
Duyne et al., Analytical Chemistry, vol. 46, No. 2, Feb. 1974, pp. 213–222.

*Primary Examiner*—F. L. Evans
*Attorney, Agent, or Firm*—Theodore B. Roessel; J. Stephen Yeo

[57] ABSTRACT

Apparatus for separating radiation due to Raman scattering from a background of fluorescence.

A sample of freely rotating molecules is exposed to monochromatic radiation of a fixed plane polarization. The resulting Raman radiation will be strongly polarized while any fluorescence will be essentially non-polarized. Orthogonal components are sequentially received by a detector which responds with output signals. The difference in signals corresponds to the Raman intensity independent of fluorescence.

5 Claims, 4 Drawing Figures

MEASUREMENT OF RAMAN SCATTERING INDEPENDENT OF FLUORESCENCE

RELATED PATENTS

The following U.S. patents are incorporated by reference: U.S. Pat. No. 3,807,862, Raman Spectroscopy In The Presence of Fluorescence, Hatzenbuhler, issued Apr. 30, 1974 and U.S. Pat. No. 3,914,055, Instrument For High Resolution Spectral Analysis With Large Optical Throughput, Wolga et al, issued Oct. 21, 1975.

BACKGROUND OF THE INVENTION

This invention relates to Raman spectroscopy in general and Raman spectroscopy in the presence of fluorescence in particular.

It is known that certain materials exposed to light radiation will emit both radiation due to Raman scattering and fluorescence.

Raman scattering is a result of quantum exchange of energy between the photons of the primary radiation and the molecular system. Information such as material identification may be obtained by spectrum analysis of the Raman scattering.

Fluorescence is the property of some materials to emit photons due to the excitation and subsequent remission by electron energy levels. If the material is fluorescent, it is possible that a background of fluorescence occurs at the same frequency as the Raman scattering, degrading the sensitivity of Raman spectroscopy. It is, therefore, highly desirable to suppress or discriminate against the effects of fluorescence. At least one effort in the prior art has been successful in obtaining this goal.

U.S. Pat. No. 3,807,862 Hatzenbuhler discloses apparatus and method for Raman spectroscopy in the presence of fluorescence. Both the Hatzenbuhler device and the present invention are based upon the phenomenon that under certain circumstances Raman scattering will be substantially polarized, but the fluorescence is comparatively random or non-polarized. The particular circumstances are that: the primary radiation source be plane polarized, as would be a conventional laser; the material sample be freely and rapidly rotating as would be small molecules suspended in a liquid or gas; and that the time constants be such that the Raman scattering takes place faster than the rotation of the molecules and the fluorescence slower than the rotation of the molecules.

The Hatzenbuhler apparatus uses a single non-polarized detector, and a plane polarized laser as the primary radiation source. A polarization rotator is interposed between the laser and the material sample and switched so as to provide alternate planes of polarization. Hatzenbuhler discriminates against fluorescence by separately detecting all the light propagating with polarization parallel to the laser polarization and then perpendicular to the laser polarization. If the intensity of the non-polarized fluorescence is the same in both directions, then the difference between the two signals obtained is a measure of the strongly polarized radiation due to Raman scattering.

The present invention provides an improved apparatus over that of Hatzenbuhler. A particular advantage of applicants invention is its compatibility with spectrum analysis systems such as disclosed in U.S. Pat. No. 3,914,055 by Wolga et al. When the teachings of the present invention are followed, the result is fluorescence suppression with a minimum of modifications or additions.

SUMMARY OF THE INVENTION

In accordance with the invention, apparatus provides a signal representative of the intensity of strongly polarized Raman radiation issuing from a sample also radiating non-polarized fluorescence. A detector is provided which is sensitive to both the Raman and the fluorescence. A polarization analyzer allows alternate planes of polarized radiation to reach the detector which generates two signals representing the intensity of radiation in each plane. The difference between the two signals is representative of the Raman radiation alone. The polarization analyzer may be a polarization rotator and a polarizer, a polarization rotator and a polarization selective acoustio optic filter, or a polarization selective filter mechanically rotatable about its axis to pass alternate planes of radiation.

DESCRIPTION OF THE DRAWINGS

Figure 1:
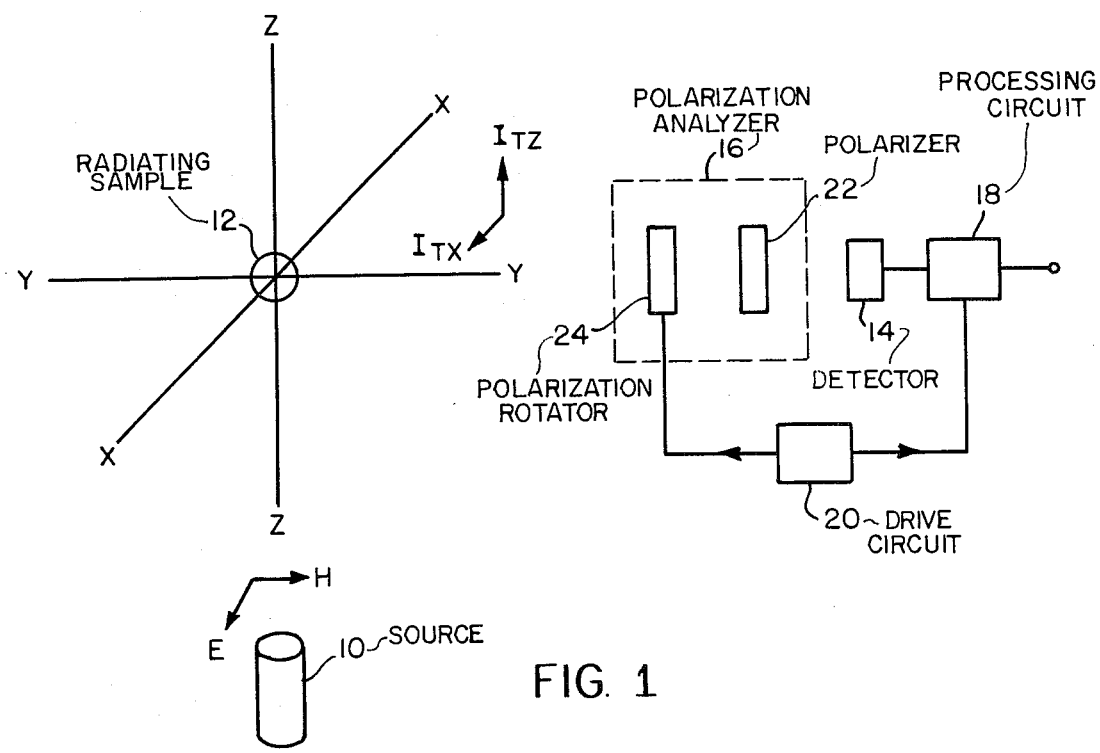
FIG. 1 is a diagrammatic view of a first embodiment of the invention.

In FIG. 1, a source 10 of plane polarized primary radiation is provided, preferably by a laser. The laser 10 is polarized along X in the coordinate system shown. The primary radiation is directed to a sample 12 of material. The sample will Raman scatter the incident light through a quantum process, the details of which are not necessary for an understanding of this invention. The Raman scatter will be strongly polarized parallel to that of the incident light or primary radiation. Let the Raman intensity along Y and parallel to the X-Z plane be $I_{RX}$ and $I_{RZ}$, then $$I_{RX} = K\overline{\alpha_{XX}^2}E_X^2 = K(\overline{\alpha}^2 + \frac{4}{45}\gamma^2(a))E_X^2$$

$$I_{RZ} = K\overline{\alpha_{ZX}^2}E_X^2 = K(\frac{3}{45}\gamma^2(a))E_X^2$$

where $\overline{\alpha}$ and $\gamma$ are as defined by L. A. Woodward in Raman Spectroscopy Theory and Practice (H. A. Szymanski Ed.) Plenum Press, N.Y. 1967, page 10 et seq.

Some materials will also fluoresce as well as Raman scatter. Fluorescence is troublesome during Raman analysis as the fluorescence may occur at the same frequency as Raman scatter, and represent background noise. If the sample 12 consists of small molecules suspended or dissolved in a liquid or gas so that the molecules are freely rotating, the fluorescence will effectively be non-polarized because the rotation rate of the molecule will be faster than the time constant of the fluorescence causing a random effect. The fluorescence emitted along Y has equal intensities for X and Z polarization due to molecular rotation during the fluorescence lifetime. Let these components of fluorescence intensity be called $I_{FX}$ and $I_{FZ}$.

A detector 14 is arranged along axis Y to receive radiation of selected polarization coming from the sample 12. The detector 14 should be low noise and sensitive enough to reliably receive Raman scattering which is generally at a low intensity. A photomultiplier is a suitable detector.

Optically interposed between the detector 14 and the radiating sample 12 is a polarization analyzer 16 arranged to pass alternate planes of polarized light from the source to the detector. One plane is parallel to the X-Y plane of the Raman scatter while the other plane is orthogonal, being parallel to the Y-Z plane of the Raman scatter. The fluorescence being essentially non-polarized would, for this purpose, be of equal intensity in both polarization planes, $I_{FX} = I_{FX}$ the detector 14 would, therefore, alternately receive the first components due to Raman scattering and fluorescence, $$I_{TX} = K(\bar{a}^2 + 4/45\ \gamma^2(a))\ E_x^2 + I_{FX}$$

and then the second components due to Raman scattering and fluorescence;

$$I_{TZ} = K(3/45\ \gamma^2(a))\ E_x^2 + I_{FZ}$$

Figure 2:
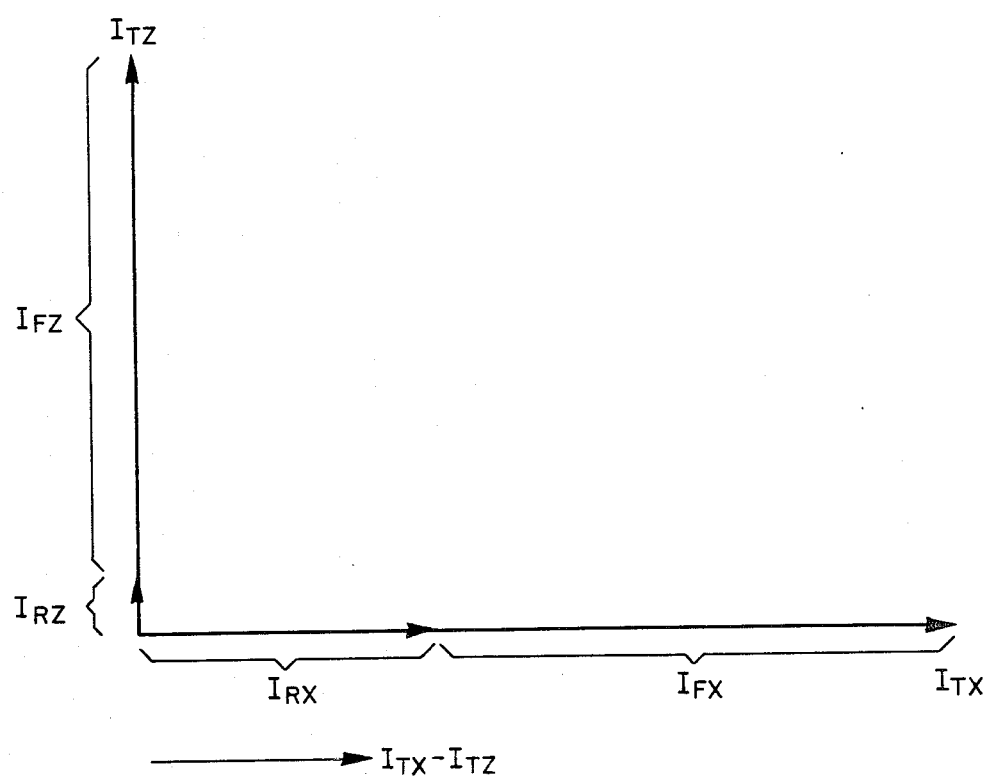
FIG. 2 is a vector diagram of the various radiation components at a given time.

These relationships are illustrated in FIG. 2. Returning to FIG. 1, the signals from the detector are passed to a processing circuit which obtains the difference. A driver circuit 20 is arranged to synchronize the shift of polarization of the polarization analyzer 16 and to control the processing circuit 18. The frequency of the drive circuit 20 should be slow compared to the molecular spin rate so as to allow the fluorescence to appear as random. The processing circuit is arranged to provide an output signal which is a measure of difference between the first signal and the second signal. The difference signal represents the intensity of Raman scattering radiation alone, independent of fluorescence.

$$I_{TX} - I_{TZ} = K(\bar{a}^2 + 1/45\ \gamma^2(a))\ E_x^2$$

As seen in FIG. 1 the analyzer may include a polarizer 22 of fixed orientation preceded by a polarization rotator 24. The rotator may be either a Kerr cell or a Pockel cell. When driven the rotator will rotate the radiation ninety degrees, so that an X component will appear as a Z, and a Z as an X. The polarizer 22 will pass radiation of only one polarity, for example, Z. Thus depending upon the driven state of rotator 24, the polarizer will pass either $I_{TX}$ or $I_{TZ}$.

Figure 3:
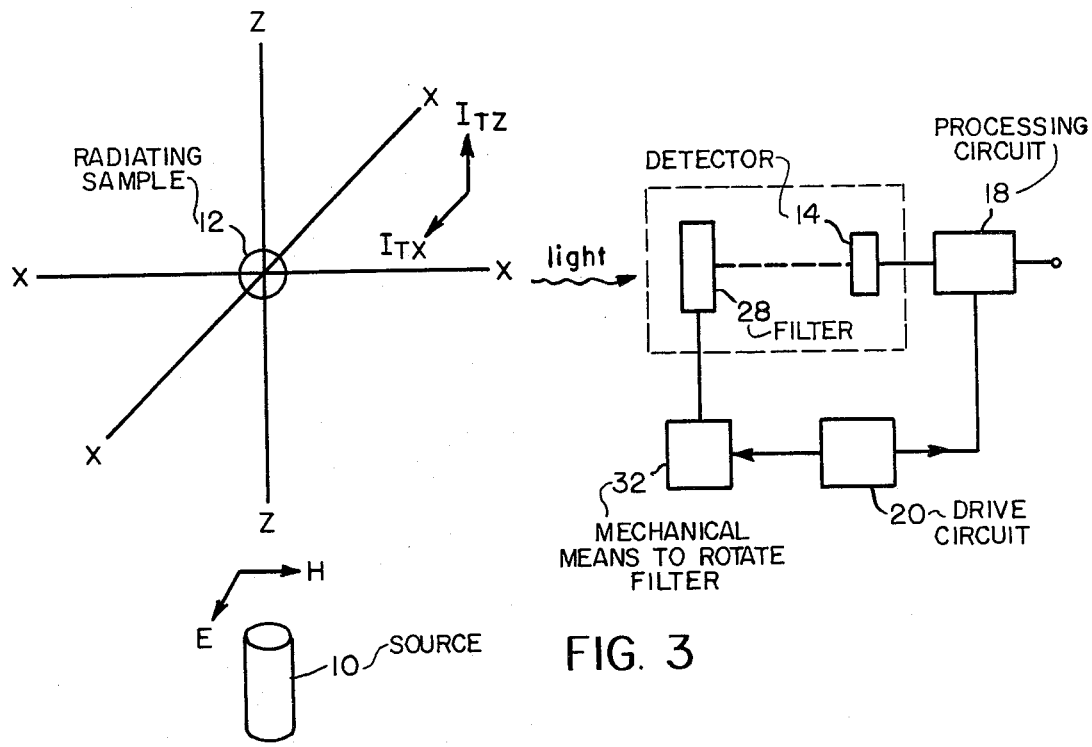
FIG. 3 shows a second embodiment.

FIG. 3 is an example of the present invention being used in conjunction with the optical spectrum analyzer of U.S. Pat. No. 3,914,055, which employs a tunable optical filter 28 which accepts and passes only one polarization plane. A suitable polarization selective tunable optical filter is the acousto-optical filter disclosed in U.S. Pat. No. 3,679,288 by Harris.

In keeping with one embodiment of the present invention, the acousto-optical filter 28 has the longitudinal optical axis along Y. Mechanical means 32 are being used to rotate the tunable acousto-optical filter about its optical axis, so as to be polarized along either X or Z. This arrangement transforms the tunable acousto-optical filter into the equivalent of the polarization analyzer of FIG. 1. When the tunable acousto-optical filter is polarized along X, $I_{tx}$ will be passed and when the tunable optical filter is polarized along Z, $I_{tz}$ will be passed. Known processing circuitry obtains the difference between $I_{tx}$ and $I_{tz}$.

Figure 4:
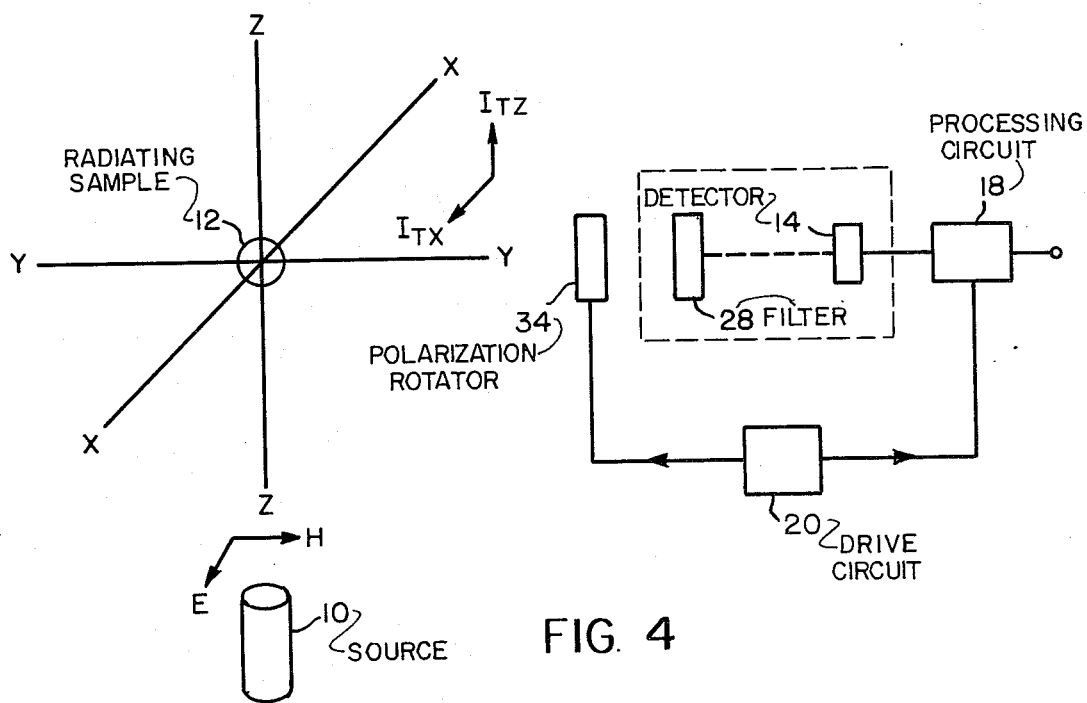
FIG. 4 shows a third embodiment.

FIG. 4 shows yet another arrangement using the apparatus of U.S. Pat. No. 3,914,055. Here, the tunable acousto-optical filter 28 is not rotated but is preceded by a polarization rotator 34. This scheme has optically the same effect as rotating the tunable optical filter but it is mechanically a simpler way to accomplish the end results.

When used as a spectrum analyzer, the tunable acousto-optical filter is adjusted to pass particular frequencies of radiation. Usually the analyzer starts at one frequency extreme and is tuned through the band to the other extreme. The instant apparatus may be used in two ways to suppress fluorescence during spectrum analysis. The first way is to measure, at a single frequency, first one polarization and then the second polarization, both measurements being taken concurrently. The second way is to make a scan across the frequency band with one polarization selected and recording $I_{tx}$. A second scan is then made with the second polarization selected and recording $I_{tz}$. Raman scattering intensity values may then be obtained at the completion of the second scan by subtracting corresponding values of $I_{tx}$ and $I_{tz}$.

Having described the invention, I claim:

1. Apparatus for separating radiation of Raman scattering from a background of fluorescence radiating from a sample, said radiation of Raman scattering having two components, a first Raman component polarized in a first plane and a second Raman component polarized in a second plane orthogonal to the first plane, the two Raman components being of substantially different intensities; said fluorescence having two components, a first fluorescent component polarized in said first plane, a second fluorescent component polarized in said second plane, said fluorescent components being of substantially equal intensities said apparatus comprised of:

a detector for generating a signal in response to Raman and fluorescence radiation intensity;

a polarization analyzer optically interposed between said sample and said detector for passing one plane of radiation at a time to said detector;

means to drive said analyzer to pass alternate planes of polarized radiation so that said detector alternately receives and detects said first components and said second components thereby generating a first signal and a second signal;

said first signal representing said first Raman component and said first fluorescent component;

said second signal representing said second Raman component and said second fluorescent component; and means for obtaining the difference of said first signal and said second signal, the difference being substantially representative only of the intensity of radiation due to Raman scattering.

2. The apparatus of claim 1 wherein said polarization analyzer includes a polarization rotator and a polarizer of fixed orientation, both being arranged in optical series between said sample and said detector.

3. The apparatus of claim 1 wheren said polarization analyzer includes a polarization rotator and a polarization selective tunable-optical filter, both arranged in optical series between said sample and said detector.

4. The apparatus of claim 1 wherein said polarization analyzer is a polarization selective tunable-optical filter aligned to pass one of said planes of radiation at a time to said detector; and means to mechanically rotate said tunable-optical filter to particular orthogonal positions about the optical axis of said filter, thereby changing the plane of polarization passed.

5. Apparatus for separating radiation due to Raman scattering from a background of fluorescence radiating from a sample, said radiation due to Raman scattering having two orthogonal components, a first Raman component polarized in a first plane and a second Raman component polarized in a second plane, the two Raman components being of substantially different magnitudes; said fluorescence having two orthogonal components, a first fluorescent component polarized in said first plane, a second fluorescent component polarized in said second plane, said fluorescent components being of substantially equal magnitudes; said apparatus comprised of:

a detector for generating a signal in response to the intensity Raman and fluorescence radiation;

a polarization selective acousto-optical filter passing one plane of radiation at a time to said detector;

means to rotate said acousto-optical filter to orthogonal positions so that said detector alternately receives and detects said first components and said second components, thereby generating a first signal and a second signal;

said first signal representing said first Raman components and said first fluorescent component;

said second signal representing said second Raman component and said second fluorescent component; and means for obtaining the difference of said first signal and said second signal, the difference being substantially representative only of the approximate intensity of radiation due to Raman scattering.

* * * * *